United States Patent
Honsowetz

(10) Patent No.: US 9,483,456 B2
(45) Date of Patent: Nov. 1, 2016

(54) GRID DATA MANAGEMENT

(71) Applicant: Jeffrey Dean Honsowetz, Vancouver, WA (US)

(72) Inventor: Jeffrey Dean Honsowetz, Vancouver, WA (US)

( * ) Notice: Subject to any disclaimer, the term of this patent is extended or adjusted under 35 U.S.C. 154(b) by 950 days.

(21) Appl. No.: 13/658,211

(22) Filed: Oct. 23, 2012

(65) Prior Publication Data

US 2013/0073939 A1 Mar. 21, 2013

Related U.S. Application Data

(63) Continuation-in-part of application No. 13/236,140, filed on Sep. 19, 2011, now abandoned.

(51) Int. Cl.
G06F 3/00 (2006.01)
G06F 17/24 (2006.01)
G06F 17/30 (2006.01)

(52) U.S. Cl.
CPC ....... *G06F 17/246* (2013.01); *G06F 17/30893* (2013.01)

(58) Field of Classification Search
CPC ...... G06F 21/41; G06F 21/53; G06F 17/246; G06F 17/30893
See application file for complete search history.

(56) References Cited

U.S. PATENT DOCUMENTS

| | | | |
|---|---|---|---|
| 5,293,615 A | 3/1994 | Amada | |
| 5,416,895 A * | 5/1995 | Anderson et al. | 715/209 |
| 7,213,199 B2 | 5/2007 | Humenansky et al. | |
| 7,299,223 B2 | 11/2007 | Namait et al. | |
| 7,743,071 B2 | 6/2010 | Yang et al. | |
| 7,840,600 B1 | 11/2010 | Bhatia | |
| 7,917,841 B2 | 3/2011 | Chopin et al. | |
| 7,917,845 B2 * | 3/2011 | Harrington | G06F 17/2229 715/234 |
| 2003/0182287 A1 | 9/2003 | Parlanti | |
| 2004/0128400 A1 | 7/2004 | Srinivasan et al. | |
| 2005/0192920 A1 | 9/2005 | Hodge et al. | |
| 2005/0267868 A1 | 12/2005 | Liebl et al. | |
| 2006/0075328 A1 * | 4/2006 | Becker | G06F 17/246 715/213 |
| 2006/0085444 A1 | 4/2006 | Sarawgi et al. | |
| 2006/0085446 A1 | 4/2006 | Thanu et al. | |
| 2006/0112123 A1 | 5/2006 | Clark et al. | |
| 2007/0050698 A1 | 3/2007 | Chopin et al. | |
| 2008/0250068 A1 * | 10/2008 | Martyn et al. | 707/104.1 |
| 2009/0006271 A1 | 1/2009 | Crowder | |
| 2009/0319542 A1 | 12/2009 | Le Brazidec et al. | |

FOREIGN PATENT DOCUMENTS

| | | |
|---|---|---|
| CN | 1567287 A | 1/2005 |
| EP | 1077420 A1 | 2/2001 |
| WO | 2013101914 A1 | 7/2013 |

OTHER PUBLICATIONS

"Import Another Google Spreedsheet's Data," Aug. 13, 2008, <http://blogoscoped.com/archive/2008-08-13-n89.html>, pp. 1-2.*

(Continued)

*Primary Examiner* — Kyle Stork
(74) *Attorney, Agent, or Firm* — Alleman Hall McCoy Russell & Tuttle LLP

(57) ABSTRACT

Systems and methods are provided for managing data in a grid. In one example approach, a method comprises importing data from a data source to a range of cells in a grid, where the range of cells is specified by a notation input associated with the grid, and where the notation input includes a key specifying the data source and security information associated with the data source.

21 Claims, 10 Drawing Sheets

(56) References Cited

OTHER PUBLICATIONS

"Google Spreadsheets Lets You Import Online Data," Alex Chitu, http://googlesystem.blogspot.com/2007/09/google-spreadsheets-lets-you-import.html, 2 pages, Sep. 5, 2007.

"ImportRange—Google Docs Help," Google, Inc., https://support.google.com/docs/bin/answer.py?hl=en&answer=155183, 1 page, Accessed Oct. 2, 2011.

"DBFuncs—Excel-addin for Database Querying by User Defined Functions," Roland Kapl, The Code Project, http://www.codeproject.com/KB/office/DBFuncs.aspx, 12 pages, Nov. 2, 2007.

* cited by examiner

| SpreadsheetA | | | | | |
|---|---|---|---|---|---|
| | A | B | C | D | E | F |
| 1 | | Acct | Amount | | Compl | |
| 2 | | | | | | |
| 3 | 602 | 608 | | | | |
| 4 | ByAcct | | | | | |
| 5 | 2011-07 | Account | Amount | Per Day | Complete | |
| 6 | | 10001 | $500 | $25 | Y | |
| 7 | | 10002 | $750 | $37 | N | |

614

610

| Spreadsheet B – Notation Setup to Drill from Notation in SpreadsheetA | | | | | |
|---|---|---|---|---|---|
| | A | B | C | D | E | F |
| 1 | | Acct | Amount | Date | Note | |
| 2 | | | | | | |
| 3 | 612 | ... | | | | |
| 4 | 10001 | | | | | |
| 5 | 2011-07 | Account | Amount | Date | Note | |
| 6 | | 10001 | $1000 | 7/4/11 | Adj | |
| 7 | | 10001 | -$500 | 7/12/11 | Rev | |

FIG. 6

GRID DATA MANAGEMENT

CROSS REFERENCE TO RELATED APPLICATIONS

The present application is a continuation-in-part of U.S. patent application Ser. No. 13/236,140, filed Sep. 19, 2011 and entitled DATA REPORTING, the entire contents of which are incorporated herein by reference for all purposes.

BACKGROUND/SUMMARY

Grid or table-based applications or displays, e.g., spreadsheet applications or grids, may be used to organize, access, format, and display data, e.g., financial data, from various data sources for use in generating and interacting with various reports, e.g., financial reports. In some approaches, a notation, e.g. a formula, may be included in a cell in a spreadsheet in order to retrieve data from a data source to be displayed in that cell. Further, in some approaches, data from a data source may be imported into a proprietary database so that the spreadsheet application can access the data via a spreadsheet addin or via specialized formulas, for example.

In some examples, grid applications or grid displays may be provided to a user over a network, e.g., the internet, via a website accessed via a browser running on a client computer. Further, data from various different data sources with different formats, configurations, and security settings may be imported into a grid display so that a user may interact with the imported data in the grid. Data sources may be accessed in a variety of ways. For example, data sources may be local to a client device or may be external to the client device and accessed via a local network or may be cloud-based and accessible via the internet, for example. Further, in some examples, a user may publish or share data in a grid with other users over various networks.

The inventor herein has recognized various issues with such approaches for managing data in a grid. For example, approaches which use a formula in a cell of a grid to retrieve data to that cell may perform slowly on large reports which retrieve data to a large number of cells where each cell in the large number of cells includes a formula. Further, such approaches may increase a user's difficulty in formatting retrieved data for presentation in a report. For example, on a standard report for a year trend, such approaches may have 12,000 separate formulas (e.g., 12 months×1000 rows) in 12,000 different cells and this may multiply greatly when this is used for hundreds of cost centers, for example.

As another example, in approaches which use a formula in a cell of a grid or table to retrieve data to that cell, the actual data may not be copied to the cell but instead query results may be displayed in that cell. Thus, in such approaches, the data may not be accessible for viewing by users that do not have access to the system or addin used to import the data. In some cases, the users may be able to view the imported data, but not be able to freely work with the data since each data is represented by a formula that is not available to the user without the specialized addin.

As another example, approaches which import data from a data source into a proprietary database so that the a grid can access the data may increase delays in accessing and updating data, reduce accessibility to data, limit access to data that is transactional in nature, and increase resource drain. For example, when updating data in a report, a user may have to wait for updates to a proprietary database before data can be updated in the grid. As another example, different types of data, e.g. from different data sources, may have to be imported separately into the proprietary database before being accessed by the grid.

Further, in such approaches, a user may not be able to change how the data is displayed during an import, e.g., a user may not be able to customize where columns of data are placed/imported into a grid display. For example, such approaches may automatically import data from a data source into a contiguous range of cells in a grid without any options for customizing where and how the imported data is displayed in a grid during an import of data from the data source.

Further, such approaches may not take into account different security settings associated with different data sources for accessing data in different data sources. Thus, for example, data from a data source which requires a specific form of authentication to access and import data into a grid may not be accessible to a user of a grid application or display, or may require a series of manual authentication steps performed by a user to download secure data and then import or copy and paste the downloaded data into a grid or table for display.

Further, such approaches may lack security features for specifying if and how the data imported into a data grid may be published or shared. For example, a user may not have any options to customize security settings associated with a grid in order to securely share a data report with select users over a network, for example.

In one example approach, in order to at least partially address these issues, a method is provided for managing data in a grid. The method comprises importing data from a data source to a range of cells in a grid, where the range of cells is specified by a notation input associated with the grid, and where the notation input includes a key specifying the data source and security information associated with the data source.

In this way, the number of formulas used to create a report may be reduced. For example, a user may only use one formula associated with a notation input to import data versus 12,000 different formulas as in the example given above, thus increasing speed and efficiency in accessing, updating, and formatting data in a report.

Further, in this approach an open data structure may be utilized allowing a direct connection to any database or web service to retrieve data, thus reducing delays, reducing resource drain, and increasing versatility in report generation. Further still, in this approach, portability in sharing reports with users that do not have a specialized addin or formulas may be increased.

Further, in this approach, user control over data handling and display in a grid may be increased since a user may interact with various data sources via references in a notation input associated with a grid or via input parameters in one or more cells of the grid to specify target locations of where data is imported into the grid, formatting of imported data in the grid, filtering of imported data in the grid, and other presentation options of data displayed in the grid.

Further, by referencing security options associated with a particular data source in the notation input associated with the grid, a user may automatically access secured data within various different data sources. Thus, in this approach, data may be imported from various different data sources with different formats, configurations, or security settings via various different networks.

Further, in this approach, security features for specifying if and how a data grid may be referenced in a notation input so that a user may customize security settings associated with a grid in order to securely share the grid with select users over a network, for example.

This approach unites the best of a spreadsheet with data services or databases and when combined with the right measure of security, user options, and the ability to drill or link in context to other spreadsheets or areas, becomes far more than a reporting system or a method to collecting data. Such an approach provides a practical platform for solution development that is fast, secure, easy for users to utilize, leverages familiar technology to developers, is scalable while able to be focused on small needs, and leverages existing software most companies already own. For example, in this approach spreadsheets may be leveraged as an interactive thin client in various cloud environments to provide functionality for cloud spreadsheets without sacrificing the benefits of thin client spreadsheet cloud applications and while fortifying the ability for managing application code centrally. Furthermore, the functionality may be portable to all brands of cloud or locally installed spreadsheets due to its familiar formula based approach. Such an approach may be applied beyond spreadsheets into more general grid based presentations that exist outside a formal spreadsheet program. Furthermore, this approach may be expanded to other types of notations that provide similar function but are not directly associated with a cell of a grid.

It should be understood that this summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows an example of providing an experience to a user of drilling down data by connecting two or more notations that display data.

DETAILED DESCRIPTION

Figure 1:
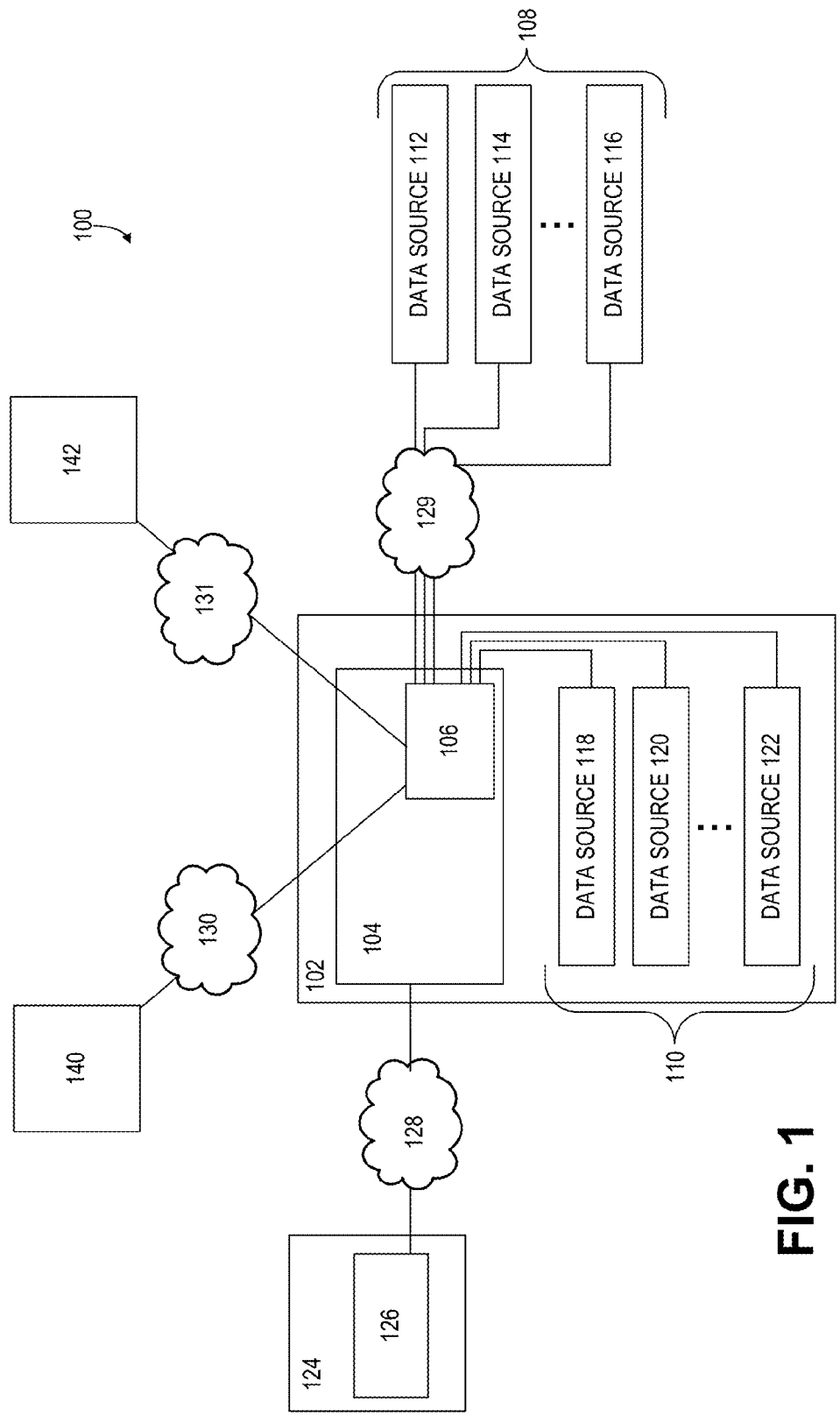
FIG. 1 shows a schematic illustration of an example computing environment in accordance with the disclosure.
Figure 2:
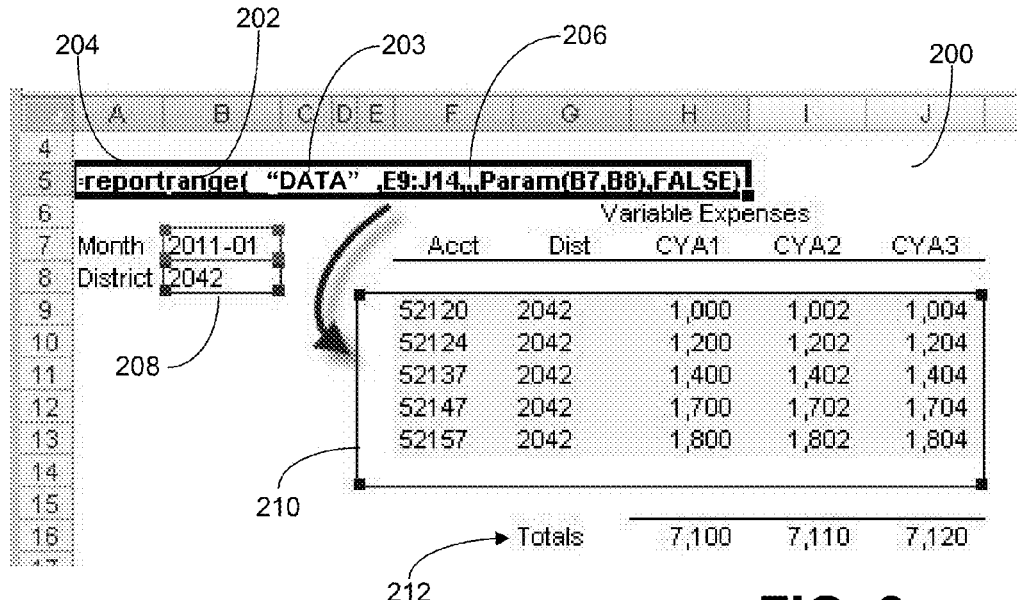
FIG. 2 shows an example notation input associated with a grid for importing data from a data source.
Figure 3:
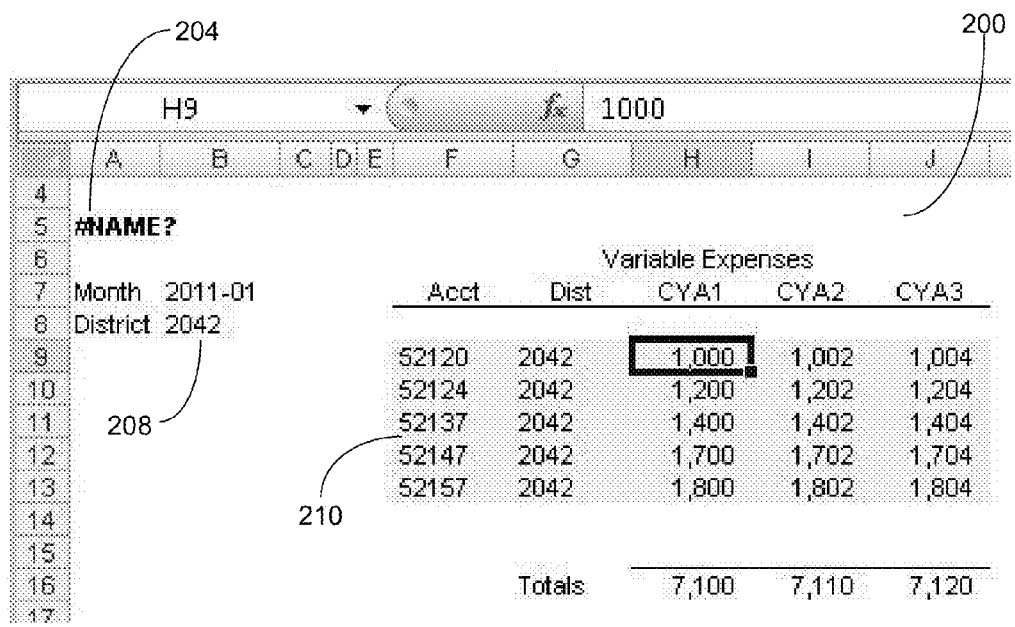
FIG. 3 shows an example grid data report as viewed by users that do not have access to the notation input.
Figure 4:
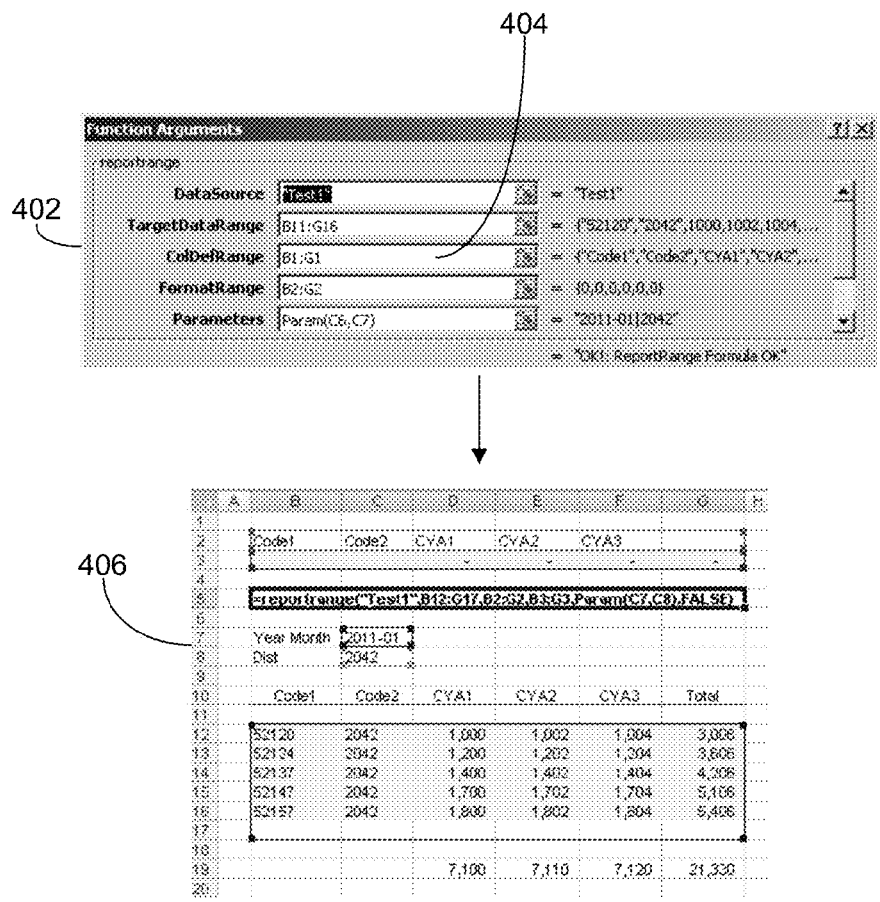
FIG. 4 illustrates pulling data from a data source using notation input as assisted by dialogue boxes in a grid application or display.
Figure 5:
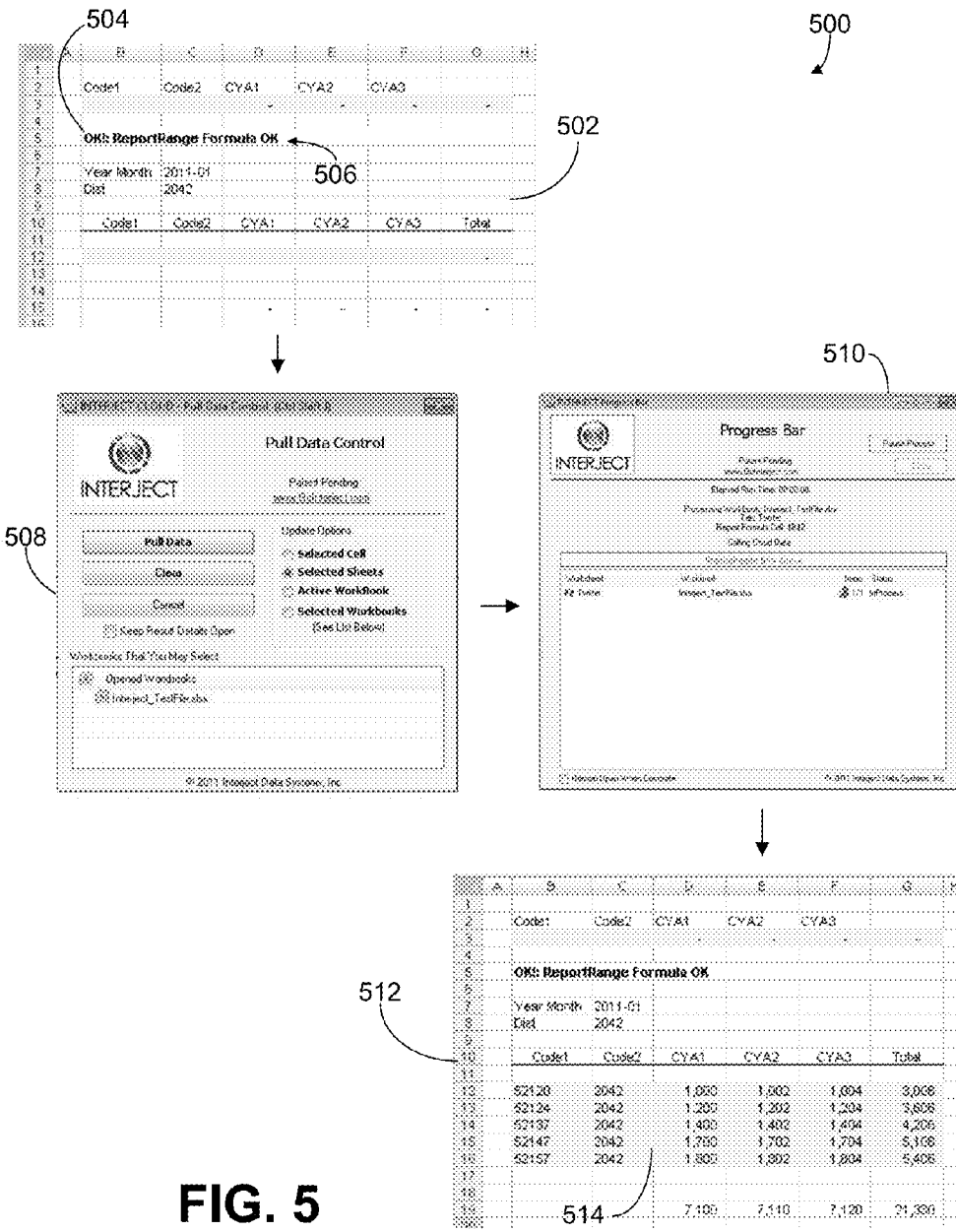
FIG. 5 illustrates notation input as assisted by a dialogue box in a grid application or display.
Figure 7:
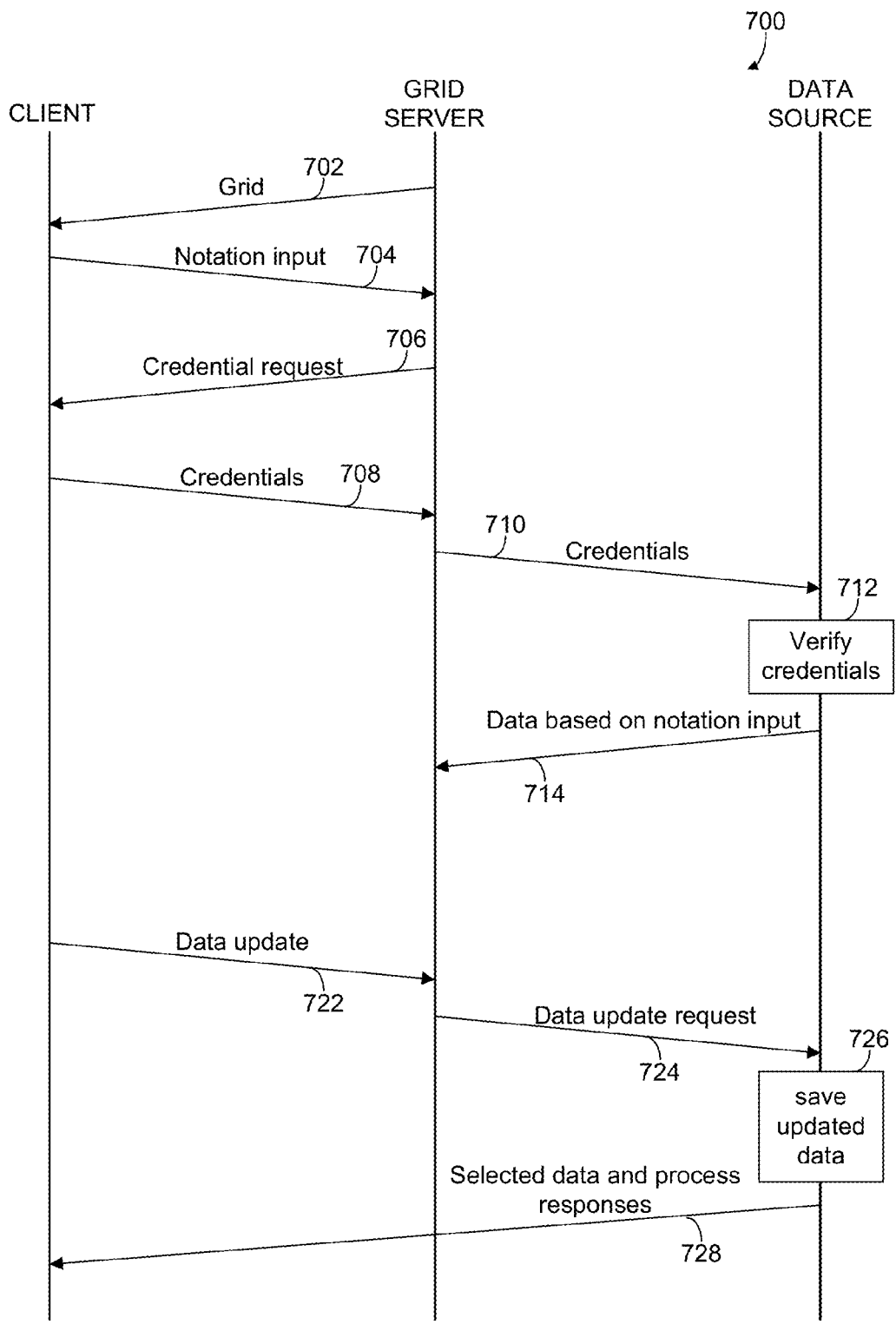
FIG. 7 shows an example communications flow diagram illustrating communications among a client device, grid server, and data source in accordance with the disclosure.
Figure 8:
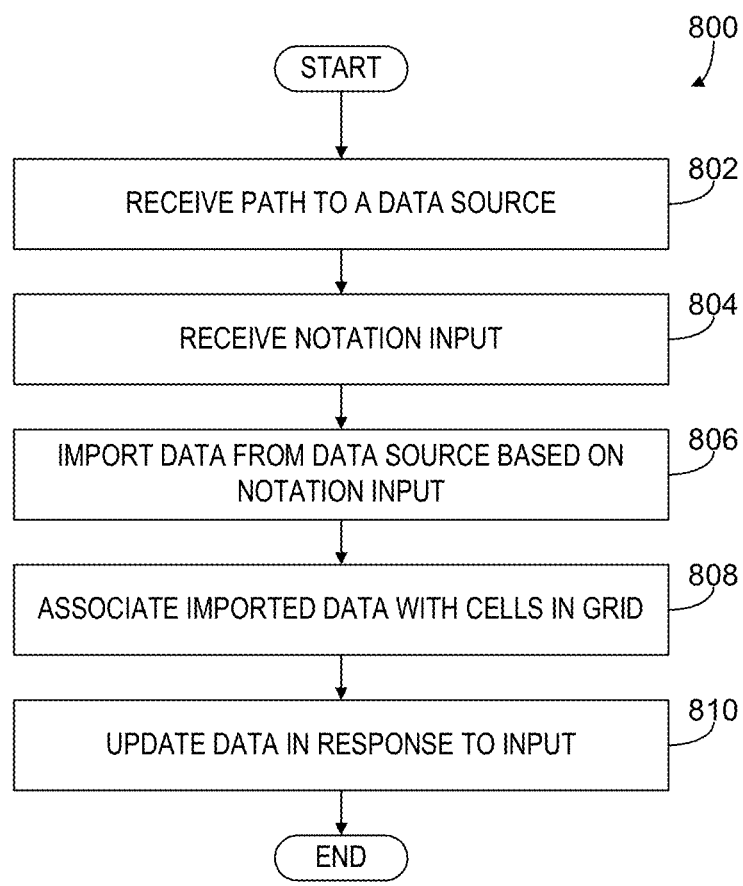
FIG. 8 shows an example method for importing and updating data from a data source to a grid using notation input.
Figure 9:
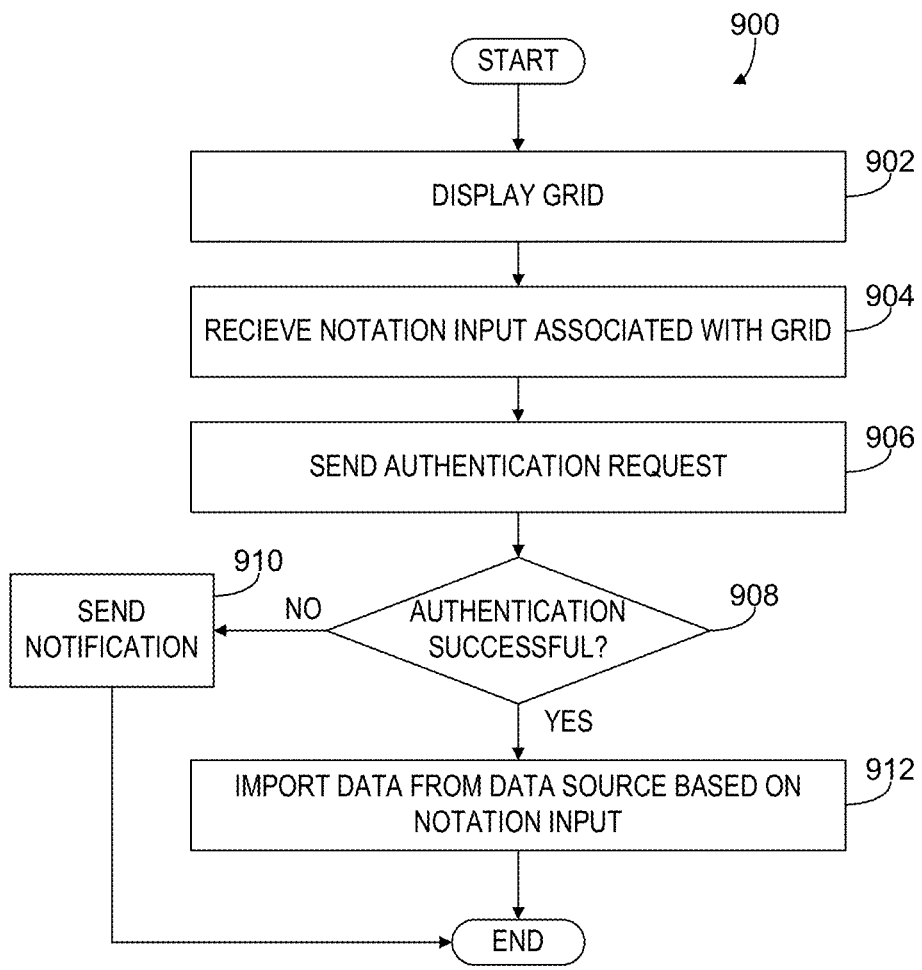
FIG. 9 shows an example method for managing data in a grid in accordance with the disclosure.

As remarked above, grids or tables, e.g., as provided by a spreadsheet application running on a computing device, may be used to organize, access, and format data, e.g., financial data, from various data sources for use in generating and interacting with various data reports. The present disclosure is directed to managing and interacting with data in a grid directly from data sources in a computing environment such as shown in FIG. 1. As shown in FIGS. 2 and 3, a notation input may be associated with a grid and may reference various parameters for importing, interacting with data, and returning specific data points from various data sources. In some examples, such specialized formulas may be implemented via an addin or plug-in associated with the grid. For example, as shown in FIGS. 4 and 5, various dialogue boxes associated with a grid may assist a user in modifying notation input parameters to import, format, and interact with data displayed in a grid. In some examples, as illustrated in FIG. 6, notation inputs may be used to assist a user in performing drill downs on data in a grid or table, permitting a user to easily access more detailed views of data of interest. FIGS. 7-9 illustrate various example methods for managing data presented in a grid format.

Turning to the figures, FIG. 1 shows an example computing environment 100 for managing data in a grid. For example, computing environment 100 may be used to import data from various data sources in various locations, e.g., local data sources, networked data sources, or cloud-based data sources, into a grid for data management and display.

Computing environment 100 includes a grid server 102 configured to provide instances of grids or tables to a user for managing data. For example grid server 102 may include a grid application 104, e.g., a spreadsheet application or the like, configured to provide a grid to user for data input, data importing, data manipulation, data sharing, data formatting, etc. Grid server 102 may be any suitable computing device configured to provide a grid to a user in any suitable way. For example, grid server 102 may be configured to provide a grid via network 128 to a client device 124. Network 128 may be any suitable network, e.g., network 128 may be a local area network or the internet, for example. Client device 124 may include a browser 126 or other suitable application configured to access grid server 102 and display a grid or table provided by grid server 102 on a display of client device 124. For example, grid server 102 may be a company server into which users log-on via terminal computers in order to access grid application 104. As another example, grid server 102 may be configured as a web server into which users of personal computers may remotely access grid application 104 via the internet. For example, grid application 104 may be configured to operate in a cloud computing environment, e.g., the application may be running over a plurality of servers and may be accessible by users of client devices over the internet. The client devices may be personal computing devices or mobile devices, e.g., cell phones, tablets, laptops, or the like. For example, a user may desire to manage data in a grid or table via the cloud from a variety of different locales or networks.

As another example, a user of grid server 102 may locally access a grid provided by the grid server. For example, a user of grid server 102 may access a grid or table by running a grid application, e.g., grid application 104, on grid server 102. Thus the grid application 104 may be locally installed on a client computer or may be utilized through a web browser, for example.

In some examples, the grid server 102 and/or grid application 104 may include an addin 106 or other suitable plug-in configured to confer additional functionality to grid server 102 and/or grid application 104. However, in some examples, additional functionality as described herein may be built directly into the functionality of the grid server or grid application. For example, addin 106 may provide the grid server or grid application with specialized functions accessible by a user of a grid or table provided by grid server 102 to perform additional tasks within the grid. For example, as described in more detail below herein, the addin 106 or additional functionality may provide various functions which can directly interface with various specified data sources to import, format, and update data in a grid provided by grid server 102. Further, the addin 106 or the additional functionality may provide various authentication options for accessing different data sources with different security requirements and stored procedures and may provide various filtering and display options for control of data presented in a grid. Examples of authentication and filtering options are described in more detail below.

Data sources accessible by the grid server may be any suitable sources of data, e.g., databases, web data servers, and proprietary databases associated with programs such as Enterprise Resource Planning (ERP) Systems, Business Intelligence Solutions, Data Warehouses and transactional data systems, for example. In some examples, such data sources may be external to grid server 102 and/or client device 124. For example, a plurality of external data sources 108 including data source 112, 114, and 116 may be accessible to grid server 102 via addin 106 or via additional functionality in grid server 102. In some examples, data sources may also be internal to grid server 102 and/or client device 124, e.g., residing in a memory component of grid server 102 or client device 124. By way of example, a plurality of internal data sources 110 including data sources 118, 120, and 122 may be accessible to grid application 104 via addin 106.

As described in more detail below, any suitable data source may be accessed by grid server 102 once a path to the data source is specified. A path to a data source may be a network path, e.g., for a cloud-based data source, or a local path to a data source stored on grid server 102 or client device 124. For example, a path to a cloud-based data source may include a URL. For example, an administrator may register a data source by providing a path or address to the data source and security settings and various other protocols associated with the data source. In this way, data may be directly imported into a grid from a variety of different data sources or data servers with different data storage formats and protocols.

Further, in some examples, a data source may have security settings and associated with it so that a user of the data source may provide authentication credentials where a form of the authentication is specific to the data source. In other words, a plurality of different data sources may have a plurality of different security settings and authentication protocols associated with them. Thus, for each different data source accessed by a grid, particular security settings and protocols may be associated with the data source. For example, when registering a data source, an administrator may specify security preferences associated with that data source in addition to specifying a path to the data source. In some examples, this data source information may be stored in a repository 140 so that information in the repository may be accessed by a grid provided by grid server 102. Repository 140 may be accessible by grid server 102 over a network 130, e.g., via the internet, so that repository 140 is a cloud-based central repository. However, in other examples repository 140 may be stored on grid server 102 or on client device 124.

For example, as described below, a user may provide a notation input associated with a grid and the notation input may reference information stored in repository 140 in order to import data into and manage data presented in a grid. The additional functionality provided by addin 106 or built into grid server 102 may be configured to automatically authenticate a user with a specified data source in order to import data from the data source and/or update data stored in the data source.

Further, in some examples, grid server 102 may be configured to communicate with various other web services to perform various actions associated with an instance of a grid provided by grid server 102 to a user. For example, a web service server 142 may be accessed by grid server 102 via a network 131 which may be a local network or the internet, for example. For example, web service server 142 may, in some examples, perform various functions on behalf of grid server 102 in response to user inputs associated with a grid provided by grid server 102. For example, web service server 142 may handle a portion of authenticating a user for a particular data source access or may handle a particular HTTPS protocol. As another example, web service server 142 may handle sharing or publishing of a data report generated by an instance of a grid.

The functionality of addin 106 may enable specialized notation input for managing data from data sources registered with the grid application 104 or on grid server 102 and may be used in addition to other tools and forms available in the grid application or provided by the grid server. For example, addin 106 may enable specific functions to be added to a grid. Addin 106 may also refer to functionality described herein that is built within an instance of a grid itself rather than provided by a separate addin. These specific functions may utilize various parameters to manage data from specified data sources and to handle different data sources and associated authentication procedures and data storage formats. For example, such specialized functions may be used to import, update, format, and/or drill down data from various data sources as well as handle authentication procedures so that a user can access data in a specified data source. An example notation input associated with a grid is shown in FIG. 2.

In particular, FIG. 2 shows an example grid 200 with an associated notation input 202. Notation input 202 may include a plurality of parameters 206 which reference parameters to be used in managing data in grid 200 or to specify locations where data points can be returned to the grid in addition to data be imported. For example, notation input 202 may be used to specify a data source, reference parameters in entries of the grid, and to import data from the data source based on the references parameters. In some examples, a notation input may not be associated with any cells in grid 200 but may be associated with the grid itself. However, in other examples, notation input 202 may be included in an initial cell 204 (cell A5 in this example). In this example, notation input 202 is a formula called "reportrange" which may be entered into initial cell 204 by a user of the grid, for example.

The notation input 202 includes a plurality of parameters 206. Parameters 206 may include any suitable parameters specifying actions to be performed by the grid or specifying how data is imported from the data source and displayed in the grid or may be used to import select data points into the grid. In some examples, parameters 206 may be specific to a type of notation input entered into a spreadsheet and may depend on a configuration of a data source accessed to import data. For example, data in a first data source may be managed using a first function that takes a first number of parameters whereas data in a second data source may be managed by a second function that takes a second number of parameters, where the first function is different from the second function and/or the first number of parameters is different from the second number of parameters. The number of parameters used in a function to manage data from a particular data source may be based on the structure of that data source, storage protocols of that data source, security settings of that data source, and/or how the data source is setup by an administrator, for example. For example, the data source may include one or more fields and the notation input may specify a range which includes at least one of the one or more fields so that the data associated with those fields in the data source is imported into the grid. Such fields may be different for different data sources. In some examples, in the absence of a specification of a range, all fields may be included when importing data from the data source.

As another example, the notation input may specify various formatting schemes to be applied to data imported into the grid and may copy down components, such as spreadsheet formulas entered by users, among the points where data is imported. For example, specification of formatting may be performed by using a parameter in the notation input which specifies a range of cells in a grid to use as a formatting template for the imported data. For example, the formatting may include format settings as well as formulas and values to be inserted with imported data. As another example, specification of formatting may include a specified range to use as a formatting template to override formatting that is already present in the at least one other cell.

In the example shown in FIG. 2, notation input 202 specifies "DATA" as a key 203 or identifier. The key 203 in the notation input may reference information associated with data to be imported into the grid. For example, the key in the notation input may reference a particular data source associated with the particular key. The key may further reference a path to the specified data source and security information, storage protocols, and other information particular to the specified data source. In some examples, the key may refer to a data portal or repository, e.g., repository 140, in order to look-up information associated with the key, such as a path to the data source, authentication protocols associated with the data source, data source configuration schemes, etc. For example, the key may reference a network address, database connection string, or a path to a folder location of a data source on a computing device. In other examples, the notation input may include as a parameter the path itself to the data source, e.g., a network address, database connection string, or a path to a folder location of a data source on a computing device.

In some examples, the notation input may include two or more keys or identifiers specifying various parameters passed to a user of grid 200 so that the user can interact with a data pull or save data to a specified data source. For example, a notation input may include a first identifier which references a path to a specified data source and a second identifier which references security settings associated with the specified data source so that a user of grid 200 may be authenticated in order to import data from the data source.

In some examples, notation input 202 may also reference other cells or inputs within the spreadsheet application. Such other inputs may include parameters used in interacting with the data source, for example. For example, in FIG. 2, notation input 202 references other cells 208 which specify month and district data to be entered as parameters in the notation input. These parameters may be used to specify which data in the data source to import into the spreadsheet. As another example, the notation input may reference other inputs in cells, where the other inputs include parameters specifying which data to import from the data source and/or how the imported data is displayed in the grid. For example, the notation input may reference parameters in the grid which specify filtering options when pulling data from a specified data source. For example, a user may desire to filter a data request differently each time data is pulled form a data source or may desire different presentations or sorts of data during different pulls of data from a data source. Further, these additional parameters included in a grid and referenced by the notation input may be used for validating data pulled from a data source with respect to other specified data.

Notation input 202 may also specify a range of cells within the grid where data from a data source is imported. When a notation input is associated with an initial cell, e.g., initial cell 204, the range of calls may not include the initial cell. For example, in FIG. 2 notation input 202 specifies the range 210 (cells E9:J14) to which data from the data source is imported. In some examples, the specified range of cells may include at least two rows so the data can be inserted from the first row and new rows added as needed underneath the first row. The bottom row in a specified range may be an anchor so that data analysis formulas, e.g., summation, can be used to operate on the entire range of data when data is imported and/or updated. In some examples, the width of the specified range may encompass the data requested, but can extend beyond that to capture formulas with the data that is inserted. By way of example, column G at 212 in FIG. 2 shows a formula that totals the three columns to the left of the specified data range 210.

In this way, the number of formulas used to create a report may be reduced. For example, on a standard report for a year trend, this approach may permit a user to import data into 12,000 different cells (12 months×1000 rows) using one formula in the initial cell rather than having 12,000 separate formulas in 12,000 different cells. The imported data could even be presented in different subtotaled sections based on the configuration of the notation. Having one formula to import data to multiple different cells may increase speed and efficiency in accessing, updating, and formatting data in a report, and reduce resource load while retrieving live data, for example.

Further, inputs and outputs to a user within a spreadsheet or grid area may be coordinated by using parameters referenced by the notation input to associate output/input parameters to specified cells for user interaction. As described below, these parameters may be passed to the associated data source during data importing and data updating procedures.

The data imported from the data source via notation input 202 may be copied to each cell in the specified range of cells so that the data is viewable in the grid without the addin functionality. In this way, portability in sharing reports with users that do not have a specialized addin or formulas may be increased. For example, FIG. 3 shows how the grid 200 shown in FIG. 2 may be viewed by a user that does not have access to the functionality conferred to the grid by an addin. In this example, the notation input 202 has been removed or stripped in the initial cell 204 and replaced with a placeholder, e.g., "#NAME?." However, since the data is actually copied to the cells in the range 210, the data is still visible to the user. Furthermore, the notation is normally out of view and is not noticed by the user.

In some examples, an addin may enable functionality within the grid to assist a user in entering specialized notations and parameters for the enabled functions. For example, various dialogue boxes, wizards, or other suitable assistance may guide a user in entering notation input and importing, formatting, and updating data from data sources.

FIG. 4 illustrates an example of how parameters may be input into notation input as assisted by a dialogue box in a grid application. For example, a dialogue box may be provided by the grid application and configured to guide a user to input parameters into notation input. The dialogue window or box at 402 may be presented to a user in response to input by the user. By way of example, dialogue box 402 shows an input form 404 within which a user may input desired parameters for a particular notation input or function. After the user inputs the parameters into the form, the dialogue box may be used by the grid application to import data based on the entered parameters in response to another user input into the spreadsheet application. For example, the user may enter "Ctrl Shift J" via a keyboard input into the spreadsheet application and the data will be imported or updated in the spreadsheet as shown at 406.

As another example of how an addin may enable functionality within the grid application to assist a user in entering specialized notations for managing data from a data source in a grid application, FIG. 5 illustrates steps 500 for pulling data from a data source using notation input as assisted by dialogue boxes in a grid application.

At 502, FIG. 5 shows a grid which uses notation input to import data into a range of cells in the grid. As shown in FIG. 5, after a user enters notation input into an initial cell, the spreadsheet application may be configured to check whether the syntax of the notation input is correct. For example, as shown at 506 in FIG. 6, the grid includes a notification that the formula entered into the initial cell 504 is correct. In this example, the notification is indicated by the grid application displaying "OK!" in the initial cell 504. Further, in some examples, validation of any parameters included in a notation associated with a grid may be performed and notification may be sent to the user if an error is encountered.

In order to run a report in this example, a user of the grid may cause the grid to import or update data based on the notation input by a suitable input into the grid.

For example, a user may select an option from a menu in the grid or enter "Ctrl Shift J" via a keyboard input.

In response to the user input, the grid application may display dialog box 508. Dialogue box 508 displays various options that a user may choose in updating or importing data into the grid. For example, dialogue box 508 provides options permitting the user to choose whether to import data to a single selected cell, selected sheets, or an entire grid workbook. Once the user clicks 'Pull Data' a progress window 510 may be displayed by the grid t application as the data is pulled from a data source. The imported data is then copied into the cells in a specified range 514 in the grid as shown at 512.

In some examples, users of data reports may desire to view some of the data in a more detailed manner. For example, a user may desire to drill down on existing data to view more details about a particular data entry. In some examples, a notation input may be used to assist a user in drilling down on data by connecting two different notations that pull data independently. Multiple drill notations may be used in the same grid between different areas of the grid or grids that exist in other files. It may not always be the preference of the user to initiate the action of pulling data in the destination in one or more notations. As a result, the drill notations may simply be used for navigation in some examples.

FIG. 6 shows an example of importing data, updating data, and drilling down data using notation input. In spreadsheet A in FIG. 6, a first notation input or formula may be entered into an initial cell at 602 to import data into a range of cells 610 in spreadsheet A. For example, a formula "=ReportRange("TestDataSource",6:7,1:1,2:2,Param(A4, A5)" may be entered into cell 602 where "=ReportRange" is an example marker for the notation. However, a notation may be marked in a variety of other ways. Here, by way of example, "TestDataSource" is an example key that is associated with the data source path (or a reference to the path) or could be the data path, connection string, or data SQL request itself. In the example formula, "6:7" is a reference to rows 6 through 7 being the range that is at least one other sell in the spreadsheet or grid application. In the example formula, "1:1" relates to row 1 which may contain settings and parameters related to the interaction with the data source and what is presented in the target range. In this example, it is used to note which fields are to be presented from the data source. In the example formula, "2:2" relates to row 2 which could contain specific formatting for the target range. If not specified, it may simply use the formatting in the target range. Further, "Param(A4,A5)" in the example formula is another example of referencing other settings and parameters that are used to interact with the data source. These could be used in a variety of ways including filtering what data is shown, how it is presented or how it may be updated. In this example, the user wants the results by account and for the month of July 2011.

Through a user action or event, e.g., a user input via a keyboard or mouse, the data target in rows 6 through 7 in spreadsheet A can be updated based on the notation specified in cell 602 (cell A3). Depending on the notation marker, the target range may be expanded to fit all rows specified from the database or it may be fixed and only import data specified in row markers. In addition, a user action or event can cause the data changed within the target range to be updated back into the data source. This update process can be referenced by the original notation or another notation that is specifically setup for the update process.

Further, if no field name is specified in row 1 of spreadsheet A, the system can simply copy downward existing formulas from the top of the target range or from the formatting range in row 2, if specified.

Another spreadsheet, spreadsheet B, may include a second notation entered into an initial cell in spreadsheet B at 612 to import a more detailed view of a subset of the data imported into spreadsheet A. For example, the data in spreadsheet A includes account numbers and financial information associated with each account and spreadsheet B may include more detailed data associated with each account. In the example shown in FIG. 6, spreadsheet B shows detailed information associated with an account named 10001.

In order to provide drill down functionality to permit a user to easily view detailed data from spreadsheet A, a third notation may be included in a cell 608 in spreadsheet A. This third notation may reference the location of another spreadsheet to pull data from, in response to a user selection of that third notation, for example. For example, cell 608 in spreadsheet A may include a formula "reportdrill(,"APDrill",pairgroup(pairext("C:B","A4")),"Drill to AP Details")" where "APDrill" is a key that references the location of another spreadsheet to open the report. Spreadsheet B illustrates this other location. In this example, "Sheet1!A3" illustrates another way to reference the other report location. This direct reference can be used in place of the key noted above. In this example, "pairext("C:B","A4")" references a column 'B' that is used to find data relative to where the user initiates the drill action. For example, if the user drilled on row 6 in spreadsheet A, value 10001 would be noted as the value to drill on. In this example, "A4" is the location of the notation that will receive the value related to the user drill request. In using the example above, 10001 would be placed in cell A4 in spreadsheet B. Further, in this example, there could be indication in the notation if a value is required to be found before it initiates the user drill request. In this way, the drill request can be setup to only function on certain cells of the grid where data points exist. In addition, there could be multiple parameter sets added so a variety of contextual data can be passed in the drill request. These multiple parameters could reference data that is in a row relevant to where the user initiates the drill action or a specific cell or manually input data. In this example "Drill to AP Details" refers to a friendly name the user can identify to this grid option and may be helpful when there are multiple drill options provided. Lastly, the notations used to help frame the notation such as PairExt, PairGroup or ReportDrill are only examples that provide the notation structure. Other various notations could be used to employ similar functionality.

In some examples, the third notation may enable linking functionality from one or more data entries so that, upon selection of a data entry, the spreadsheet application will open another spreadsheet and display the detailed data associated with that data entry. For example, as shown in FIG. 6, the entry for account 10001 at 614 in spreadsheet A may be configured by the third notation in cell 608 to enable a user to select the entry for account 10001 at 614 and bring up spreadsheet B which displays detailed data from account 10001. For added security and manageability, a key may be used in the notation to represent a destination spreadsheet, grid, web address or other means of locating the target grid as well as address security verifications of providing the destination object to the user.

In turn, spreadsheet B may also include notation input which enables drill downs to be performed on the data in spreadsheet B so that a user may be able to drill down or across the data as far as desired.

FIG. 7 shows an example communications flow diagram 700 illustrating communications among a client device, grid server, and data source in accordance with the disclosure. For example, communications flow diagram 700 illustrates an example communication flow among client 124, grid server 102, and data source 112 shown in FIG. 1.

At 702, the grid server sends a grid to the client. For example, grid application 104 on grid server 102 may send an instance of a grid or table via network 128 to client device 124. For example, client device may connect to grid server 102 via the internet and, after logging in or authenticating with grid server 102, may receive an instance of a grid via a browser 126. As another example, a user of grid server 102 may run an instance of grid application 104 which provides a grid to the user.

At 704, the client adds a notation input to the grid server. For example, a user of client device 124 may input a notation input associated with the grid via browser 126. As described above, the notation input may be associated with the grid and may include a key specifying a data source and security information associated with the data source. The notation input may further specify a particular range of cells in a grid where data imported from the data source is to be placed within the grid. Further, the notation input may reference other inputs in cells in the grid different from cells in the specified range of cells where data is to be imported. These other inputs may include parameters specifying which data to import from the data source and/or how the imported data is displayed in the grid. In some examples, the notation input may be associated with an initial cell in the grid and the range of cells may include at least one other cell in the grid different from the initial cell. However, in other examples, the notation input may not be associated with any cell in the grid.

For example, a key in the notation input may reference information associated with a particular data source which may, in some examples, be stored in a configuration file in a repository, e.g., repository 140. After receiving the notation input from the client, the grid server may look-up information referenced by the key or keys specified in the notation input. For example, the key may be a string which identifies a particular type and location of a data source, e.g., a path to the data source. Further, security preferences may be included in the information associated with a particular data source referenced by the key. The grid server may use these security preferences to perform an authentication process so that a specified data source may be accessed in order to import data into the grid.

At 706, the grid server sends a credential request to the client. For example, based on security preferences associated with a data source referenced by the notation input, the grid server may send an authentication credentials request in order to access the data source requested by the user to import data. In some examples, the grid server may automatically authenticate a user in order to access a data source without sending any credentials requests to a user. For example, in initiating an instance of a grid provided by grid server 102, a user may log-in or authenticate with the grid server. Based on this initial authentication step, the grid server may automatically handle any subsequent authentications to specified data sources based on the initial authentication information. However, in other examples, each time a user specifies a secured data source in a notation input, the grid server may send an authentication credentials request to the user based on security settings of the selected data source in order to validate the user on behalf of the data source.

At 708, the client sends credentials to the grid server. For example, a user of client device 124 accessing a grid provided by grid server 102 may input authentication credentials particular to a selected data source. For example, a user may input a username and password and send these credentials to the grid server so that the grid server may access the specified data source to pull data from the data source.

At 710, the grid server forwards the credentials to the data source. For example, grid server 102 may forward the authentication credentials received from the user to the specified data source, e.g., data source 112, to request access to the data source for a data pull.

At 712, the data source verifies the credentials. For example, security protocols may be implemented on a data source server to authenticate a user of the data source and/or to determine a level of access provided to the user based on a user's credentials associated with the specified data source. In some examples, if an authentication request is denied by a data source, the data source may send a notification to the grid server that access has been denied or restricted to the user. The grid server may in turn send a notification to the client that access was denied so that a user of the client device may resubmit authentication credentials or terminate the data request.

However, if an authentication request was successful at the data source then, at 714, the data source sends data to the grid server based on the notation input. Here, parameters referenced by the notation input are used to pull the correct data from the data source and to ensure that only the requested data is passed to the grid. For example, based on references in the notation input to parameters in other cells in a grid, select ranges of data may be imported into the grid from the data source. Further, as described above, formatting, display, and data filter options may be applied during a data pull from the data source based on parameters in the grid referenced by the notation input.

In some examples a user of a grid may desire to modify data imported into the specified range of cells in the grid and have the modified data updated and saved back at the data source. Thus, at 722, the client sends a data update to the grid server. For example, after changing or modifying data in the range of cells of the grid, a user may input a request to update the modified data back to the data source based on the changes made to the data in the grid.

At 724, the grid server sends a data update request to the data source. For example, the grid server may again authenticate the user with the data source and updating data back at the data source may depend on credentials of the user associated with the data source. For example, some data sources may have security settings set to read-only so that data may only be downloaded from the data source but not changed at the data source. However, if the user credentials associated with the data source permit modification of data in the data source then at 726, the data source saves the updated data and at 728, the data source sends the updated data to the grid server so that the grid server can refresh the data in the grid provided to the client.

FIG. 8 shows an example method 800 for importing and updating data directly from data sources to a grid. In some examples, method 800 may be performed during execution of a grid application on a computing device.

At 802, method 800 includes receiving a path to a data source. For example, a user or administrator may set up a path to a data source in the grid application via an addin or through functionality available directly from the grid application. Such an addin may be installed by a user of a client device which accesses the spreadsheet application, for example.

In some examples, a key associated with the data source may be specified which references an actual path to the data source. Such a key may be used as a parameter in notation input to specify which data source to draw data from. For example, the key may be a name assigned to a specified path to a data source so that a user of a spreadsheet application may easily enter a specific data source into formulas by using the key. For example, the key may be a descriptor of a particular data source which assists the user in identifying what type of data source is to be referenced in notation input.

As described above, a key associated with the notation input may also reference security preferences associated with the specified data source so that data in a data source can be accessed in response to a validation of authentication credentials.

At 804, method 800 includes receiving a notation input in an initial cell in a grid application, where the notation input is associated with an initial cell in the grid application. For example, the notation input may be a formula specifying a range where data will go, said range including at least one other cell in the grid application. However, as remarked above, in some examples, a notation input may not be associated with any cells in a grid or spreadsheet but may instead be associated with the grid and stored at a location outside of the grid. In some example, the range may be selected by a user via a suitable input device such as a mouse, keyboard, or touch screen. For example, the user may select a target range by dragging a pointer using a mouse across multiple cells in a grid to select a target range to import data into.

In some examples, the data in the data source may include one or more fields and the notation input may specify a range which includes at least one of the one or more fields. The fields in a data source may be provided by an administrator of a data source and may indicate different types of data contained in the data source. Further, the different fields in a data source may be associated with each other. For example, there may be a field called "account" which holds different account numbers and there may be other fields associated with the account field, e.g., an "amount" field which includes expenditure data associated with the accounts.

Since, different data sources may have different fields, when setting up a data source to be accessible by a grid application, a user may be provided with a list of possible fields of types of data and data associations which may be imported into the grid. The different fields may then be referenced in a formula to pull data of interest from the data source.

In some examples, the notation input may include a SQL request, connection string, or other suitable database query. Namely, a user may access data in a data source by entering a specific query into the initial cell to import data into a selected target range. For example, since SQL language is typically verbose, this text may be entered into a large range of the grid and then the notation can reference such text. The query may be of any suitable format and in any suitable query language recognized by the data source.

As described above, in some examples, the notation input may reference other inputs within the grid application, where the other inputs include parameters used in interacting with the data source. Further the notation input may include a specification of formatting to be used when the data is copied to the at least one other cell in the grid application. For example, a specification of formatting may include a specified range to use as a formatting template. However, in some examples, in the absence of a specification of formatting a default formatting range may be inferred as a formatting template. For example, the default formatting range may be the target range where the data is imported.

At 806, method 800 includes importing data from a data source or updating data to a data source based on the notation input. For example, data from the data source may be imported into the grid or existing data in the grid may packaged and sent to the data source to update data as specified by the data source. In some examples, as described in more detail below with regard to FIG. 9, a user may be authenticated at a data source based on security preferences associated with the data source before importing data from the data source to the grid.

At 808, method 800 includes associating the imported data with at least one other cell in the spreadsheet application, where the at least one other cell is different from the initial cell. For example, associating the imported data with at least one other cell in the grid application may include copying the data into the at least one other cell.

In some examples, associating the imported data with at least one other cell in the grid application may include displaying the notation input in the initial cell in a display of the grid, and displaying the imported data in the at least one other cell in the same display of the grid.

At 810, method 800 includes updating data in response to input. For example, data in the at least one other cell may be updated in response to an input received by the grid application. In some examples, the data in the data source may be updated based on changes made to the imported data in the at least one other cell in response to an input received by the grid application. In this way, if a user makes changes to existing imported data in a grid, those changes may be updated in the data source itself.

FIG. 9 shows another example method 900 for managing data in a grid. FIG. 9 is described from the point of view of grid server, e.g., grid server 102, or from the point of view of any system which provides a grid to a user.

At 902, method 900 includes displaying a grid. For example, the grid may be provided by a server to a client device over a network or may be instantiated on a client computing device.

At 904, method 900 includes receiving a notation input associated with the grid. For example, the notation input may include a key specifying a data source, e.g., an external data source, and security information associated with the data source. In some examples, the notation input may be associated with an initial cell in the grid; however, in other examples, the notation input may not be associated with any cell in the grid. The key may specify a data source and may be associated with a network path to the data source. The notation input may further specify a user-selected range of cells within the grid where data from the data source is to be downloaded to. Further, the notation input may reference other inputs in cells in the grid different from cells in the user-selected range of cells. These other inputs may include parameters specifying which data to import from the data source and/or how the imported data is displayed in the grid.

Parameters referenced by a notation input can be input and output parameters. This means that they can also provide data to the grid. For example, parameters may be used to show errors found in the update process, or the date and time the data update was accepted. Such parameters may be used during both updating and importing data in a grid.

At 906, method 900 includes sending an authentication request. For example, as remarked above, based on security preferences associated with a data source referenced by the notation input, the grid server may send an authentication credentials request in order to access the data source requested by the user to import data. In some examples, the grid server may automatically authenticate a user in order to access a data source without sending any credentials requests to a user.

At 908, method 900 includes determining if the authentication is successful. For example, a user may be authenticated based on the security information associated with the data source before importing data from the data source. In some examples, in response to a receipt of authentication credentials from the user, authentication credentials may be sent to the external data source before importing data from the data source to the user-selected range of cells in the grid based on the notation input.

If authentication is not successful at 908, method 900 proceeds to 910 to send a notification indicating that the authentication was not successful. However, if authentication is successful at 908, method 900 proceeds to 912. At 912, method 900 includes importing data from the specified data source based on the notation input. For example, data may be imported to the range of cells in the grid specified by the notation input. In some examples, the notation input may be associated with an initial cell in the grid and the range of cells may include at least one other cell in the grid different from the initial cell.

Figure 10:
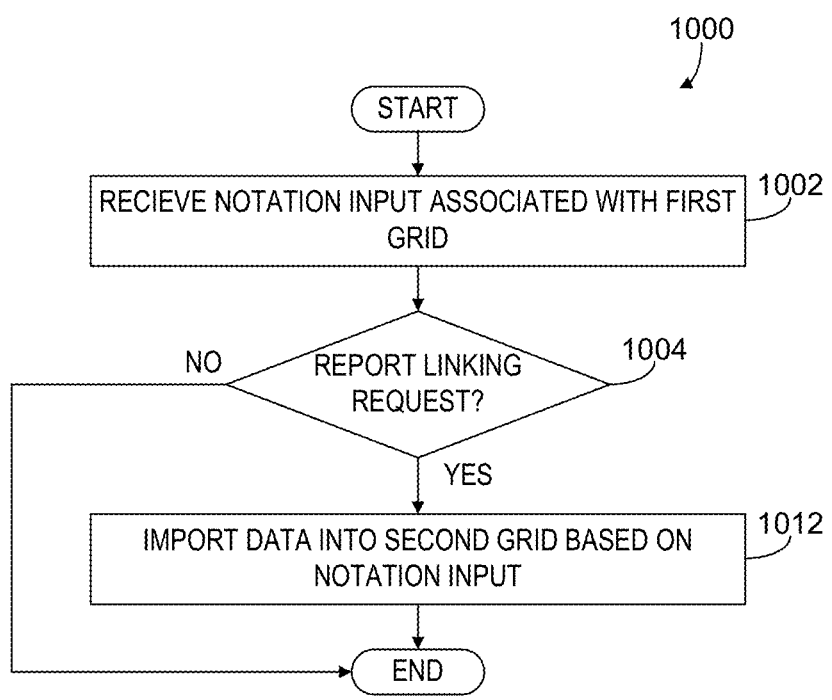
FIG. 10 shows an example method for report linking in accordance with the disclosure.

FIG. 10 shows an example method 1000 for report linking using notation input in accordance with the disclosure. Report linking may be used to pull data into other grids based on notation input and/or parameters associated with a grid.

At 1002, method 1000 includes receiving a notation input associated with a first grid. As described above, the notation input may include a key specifying a data source, e.g., an external data source, and, in some examples, may include a separate key specifying security information associated with the data source. Further, the notation input may reference other parameters associated with the grid and a range of cells within the grid where data from the data source is to be downloaded to.

At 1004, method 1000 includes determining if a report linking request is received. For example, a user action or event, such as a user input via a keyboard or mouse, may be used to trigger report linking so that options to open or go to another worksheet or a second grid to run the notation (or notations) in the new grid are provided.

If a report linking request is received at 1004, method 1000 proceeds to 1006 to import data into a second grid based on the notation input. For example, based on the notation input and parameters associated with the first grid, pertinent data may be passed from the first grid to help specify the parameters to use in the target notation when data is pulled into the second grid.

Report linking notation, as described herein, may work on any grid, even if the grid did not derive from a first notation. The source spreadsheet or grid could have been generated manually or through other software, for example. The strength of report linking is that it can be used to trap a user's keystrokes and allow options for the user to run other notations in other locations, e.g., in another grid tab, another workbook or even in the same grid. In this way, an array of single purposed reports may work together as a cohesive application.

In some embodiments, the above described methods and processes may be tied to a computing system including one or more computers. In particular, the methods and processes described herein may be implemented as a computer application, computer service, computer API, computer library, and/or other computer program product.

Figure 11:
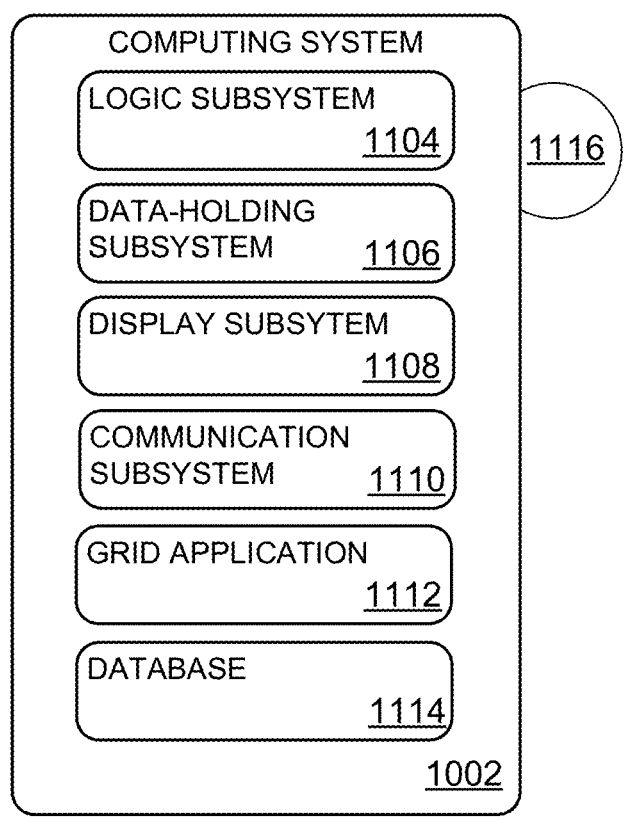
FIG. 11 schematically shows a computing system in accordance with the disclosure.

FIG. 11 schematically shows a nonlimiting computing system 1102 that may perform one or more of the above described methods and processes. It is to be understood that virtually any computer architecture may be used without departing from the scope of this disclosure. In different embodiments, computing system 1102 may take the form of a mainframe computer, server computer, desktop computer, laptop computer, tablet computer, home entertainment computer, network computing device, mobile computing device, mobile communication device, gaming device, etc.

Computing system 1102 includes a logic subsystem 1104 and a data-holding subsystem 1106. Computing system 1102 may optionally include a display subsystem 1108, communication subsystem 1110, and/or other components not shown in FIG. 11. Computing system 1102 may also optionally include user input devices such as keyboards, mice, game controllers, cameras, microphones, and/or touch screens, for example.

Logic subsystem 1104 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 1106 may include one or more physical, non-transitory, devices configured to hold data and/or instructions executable by the logic subsystem to implement the herein described methods and processes. When such methods and processes are implemented, the state of data-holding subsystem 1106 may be transformed (e.g., to hold different data).

Data-holding subsystem 1106 may include removable media and/or built-in devices. Data-holding subsystem 1106 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1106 may include devices with one or more of the following characteristics: volatile, nonvolatile, dynamic, static, read/write, read-only, random access, sequential access, location addressable, file addressable, and content addressable. In some embodiments, logic subsystem 1104 and data-holding subsystem 1106 may be integrated into one or more common devices, such as an application specific integrated circuit or a system on a chip.

FIG. 11 also shows an aspect of the data-holding subsystem in the form of removable computer-readable storage media 1116, which may be used to store and/or transfer data and/or instructions executable to implement the herein described methods and processes. Removable computer-readable storage media 1116 may take the form of CDs, DVDs, HD-DVDs, Blu-Ray Discs, EEPROMs, and/or floppy disks, among others.

It is to be appreciated that data-holding subsystem 1106 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 1108 may be used to present a visual representation of data held by data-holding subsystem 1106. As the herein described methods and processes change the data held by the data-holding subsystem, and thus transform the state of the data-holding subsystem, the state of display subsystem 1108 may likewise be transformed to visually represent changes in the underlying data.

Display subsystem 1108 may include one or more display devices utilizing virtually any type of technology. Such display devices may be combined with logic subsystem 1104 and/or data-holding subsystem 1106 in a shared enclosure, or such display devices may be peripheral display devices.

When included, communication subsystem 1110 may be configured to communicatively couple computing system 1102 with one or more other computing devices. Communication subsystem 1110 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 1102 to send and/or receive messages to and/or from other devices via a network such as the Internet.

In some examples, computing device 1102 may include a grid application 1112 which may be operatively connected to logic subsystem 1104 and data-holding subsystem 1106. Grid application 1112 may further include an addin configured to confer additional functionality to the grid application as described above. Computing device 1002 may also include at least one database 1114 or other suitable data source which may be accessed by the grid application 1112 to manage data contained in the database.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for managing data in a grid comprising:
   importing data from a data source to a range of cells in the grid, where the range of cells is specified by a first key in a notation input associated with the grid, where the range of cells is indicated for a destination of data from the data source, and where the notation input includes a second key specifying the data source and security information associated with the data source,
   responsive to a local modification in contents in one or more cells of the range of cells and a first user input, updating the data in the data source with the modified contents from the range of cells, and
   in response to a second user input, providing options for a user to navigate to other target grids, and transfer contextual data from the grid to at least one destination grid so data relevant to the contextual data can be imported in a target grid,
   wherein the notation input includes references to one or more reference cells of the grid different from the range of cells, the reference cells containing parameters which specify filtering options.

2. The method of claim 1, wherein the notation input is included in an initial cell in the grid and the range of cells does not include the initial cell.

3. The method of claim 1, wherein the notation input is not associated with any cell in the grid and is stored at a location outside the grid.

4. The method of claim 1, wherein the second key specifying the data source is associated with a network path to the data source, and wherein updating the data in the data source with the modified contents from the range of cells is performed referenced from the notation input.

5. The method of claim 1, wherein the notation input references other inputs in cells in the grid different from cells in the range of cells, the other inputs including parameters specifying at least one of data formatting, data filtering, data presentation, or data updating.

6. The method of claim 5, wherein the parameters specify select data points from the data source to be returned to the grid.

7. The method of claim 1, further comprising authenticating the user based on the security information associated with the data source before importing data from the data source.

8. The method of claim 1, further comprising authenticating the user based on a third key in the notation input before importing data from the data source.

9. The method of claim 1, wherein the grid is provided by a server to a client device over a network and the data source is a remote data source accessed by the server over the network.

10. The method of claim 1, further comprising a fourth key in the notation input specifying at least one destination grid.

11. The method of claim 1, further comprising, in response to a third user input and additional notations entered, allowing the user to navigate to other grids for navigation.

12. A method for managing data in a grid comprising:
receiving a notation input associated with the grid, the notation input including a key specifying a data source and security information associated with the data source;
sending an authentication credentials request to a user based on the security information associated with the data source or based on a second key in the notation input;
in response to a receipt of authentication credentials from the user, performing one or more of importing data from the data source to a range of cells in the grid based on the notation input and updating data to the data source in response to a user input,
wherein the notation input includes a key or address specifying at least one destination grid,
in response to the user input, providing options for the user to navigate other target grids, and transfer contextual data from the grid to one of the at least one destination grids so data relevant to the contextual data can be imported in a target grid; and
in response to the user input and additional notations entered, allowing the user to navigate to other grids for navigation.

13. The method of claim 12, wherein the data source is an external data source and the method further comprises, in response to the receipt of authentication credentials from the user, sending the authentication credentials to the external data source before importing data from the data source to the range of cells in the grid based on the notation input.

14. The method of claim 12, wherein the grid is a first grid, and further comprising:
in response to a user input, importing data from the data source to a range of cells in a second grid based on the notation input in the first grid, where the method includes performing both of importing data from the data source to the range of cells in the first grid based on the notation input and updating data to the data source in response to the user input.

15. The method of claim 12, wherein the notation input is included in an initial cell in the grid and the range of cells does not include the initial cell.

16. The method of claim 12, wherein the notation input references other inputs in cells in the grid different from cells in the range of cells, the other inputs including parameters specifying at least one of data formatting, data filtering, data presentation, or data updating.

17. The method of claim 16, wherein the parameters include a second range of one or more cells in the grid, the second range specifying filters to be applied to the imported data.

18. A computing device, comprising:
a logic subsystem; and
a data holding subsystem comprising machine-readable instructions stored thereon that are executable by the logic subsystem to:
send a display of a grid to a client device;
receive a notation input associated with the grid from the client device, the notation input including a key specifying an external data source and security information associated with the external data source, a key or address specifying at least one destination grid, and references to one or more reference cells of the grid different from a range of cells, the reference cells containing parameters which specify filtering options;
send an authentication credentials request to a user of the client device based on the security information;
in response to a receipt of authentication credentials from the user of the client device, import data from the external data source to the range of cells in the grid, where the range of cells is specified by the notation input;
in response to a user input, provide options for the user to navigate other target grids, and transfer contextual data from the grid to one of the at least one destination grids so data relevant to the contextual data can be imported in a target grid; and
in response to the user input and additional notations entered, allowing the user to navigate to other grids for navigation.

19. The computing device of claim 18, wherein the notation input is included in an initial cell in the grid and the range of cells does not include the initial cell.

20. The computing device of claim 18, wherein the data holding subsystem comprising machine-readable instructions stored thereon that are executable by the logic subsystem is further configured to, in response to a user event, import data from the external data source to a range of cells in a second grid, where the range of cells in the second grid is specified by the notation input.

21. The computing device of claim 18, wherein the data holding subsystem comprising machine-readable instructions stored thereon that are executable by the logic subsystem is further configured to send updated data to the data source based on the notation input and in response to a change in input in a cell in the range of cells.

* * * * *